No. 841,136.

PATENTED JAN. 15, 1907.

G. F. FISHER.
MOLD AND DIE FOR MAKING BUILDING BLOCKS.
APPLICATION FILED MAY 23, 1905.

2 SHEETS—SHEET 1.

WITNESSES:
Julius Lankes
Harry Harris

George F. Fisher, INVENTOR
BY
Emil Neuhart
ATTORNEY

No. 841,136. PATENTED JAN. 15, 1907.
G. F. FISHER.
MOLD AND DIE FOR MAKING BUILDING BLOCKS.
APPLICATION FILED MAY 23, 1905.
2 SHEETS—SHEET 2.
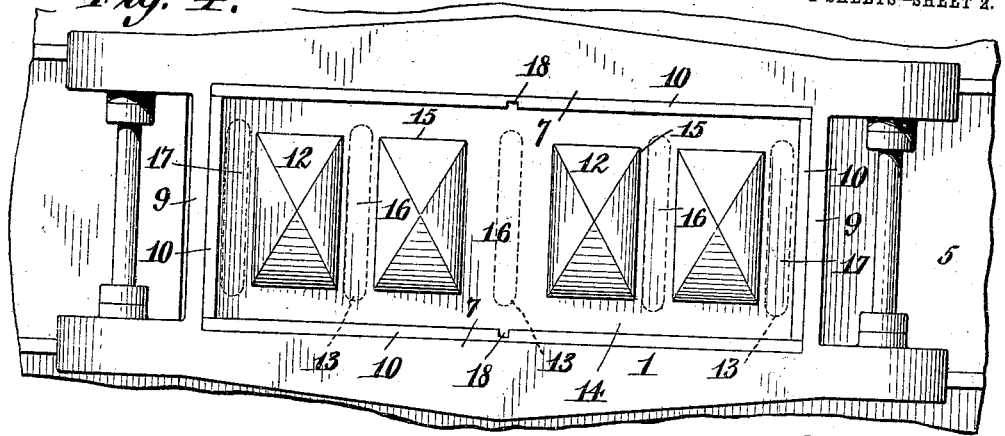
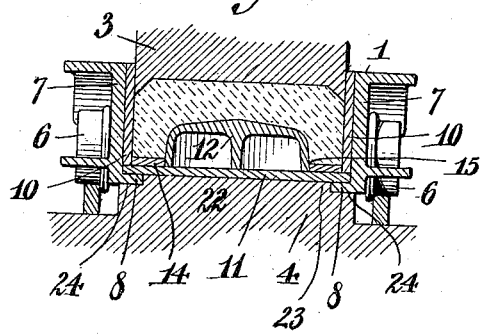
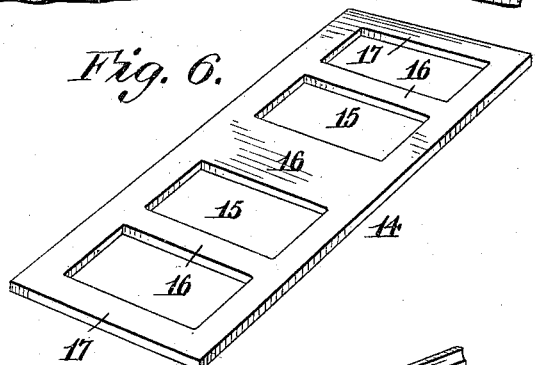
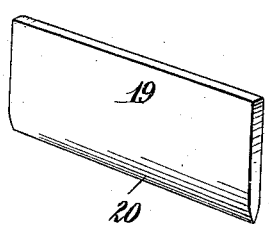
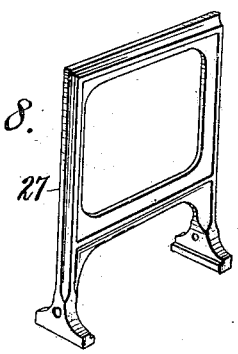
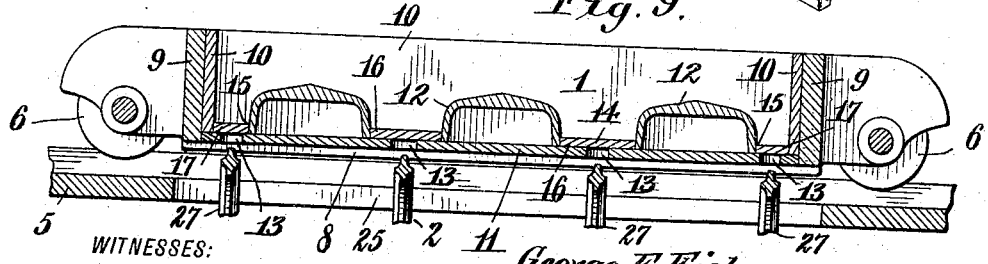
WITNESSES:
Julius Lankes
Harry Harris
George F. Fisher, INVENTOR
BY
Emil Neuhart
ATTORNEY

UNITED STATES PATENT OFFICE.

GEORGE F. FISHER, OF NORTH TONAWANDA, NEW YORK.

MOLD AND DIE FOR MAKING BUILDING-BLOCKS.

No. 841,136.　　　Specification of Letters Patent.　　　Patented Jan. 15, 1907.

Application filed May 23, 1905. Serial No. 261,846.

*To all whom it may concern:*

Be it known that I, GEORGE F. FISHER, a citizen of the United States, residing at North Tonawanda, in the county of Niagara and State of New York, have invented certain new and useful Improvements in Molds and Dies for Making Building-Blocks, of which the following is a specification.

This invention relates to molds and dies for making building-blocks such as are formed by compressing a mass of plastic or other suitable material; and it relates more particularly to a means for molding hollow building-blocks and facilitating the removal of the same from the mold.

The objects of my invention are the production of a mold and die by means of which hollow building-blocks can be quickly and conveniently molded and when molded be ejected from the mold without the least tendency to crack or otherwise become damaged or defaced, to provide removable mold-bottoms having caps or fillers thereon and block-pallets fitting over the caps or fillers and receiving supports from the mold-bottoms, to provide means for removing the pallets and the blocks thereon, and to provide improved means for forming a plurality of blocks in one mold.

Other objects will appear hereinafter and are attained by the novel arrangement and construction of parts disclosed in the accompanying drawings, in which—

Figure 1:
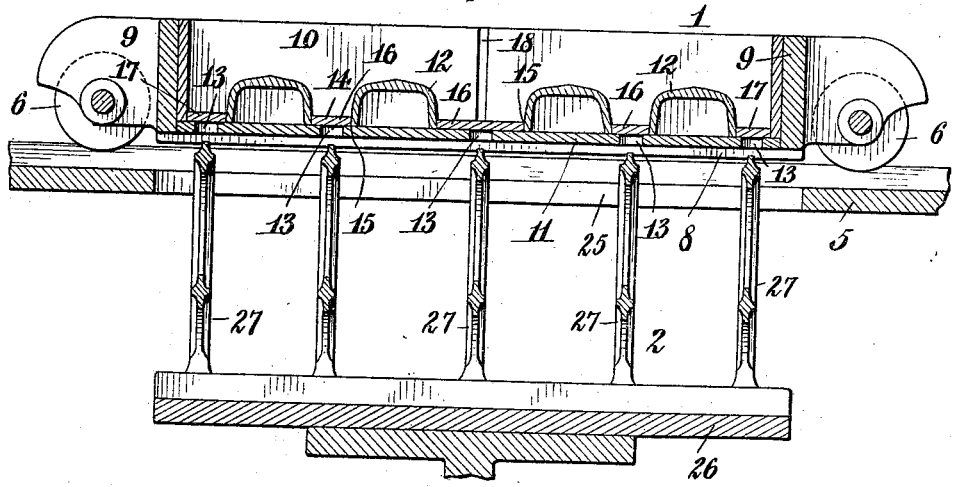
Figure 2:
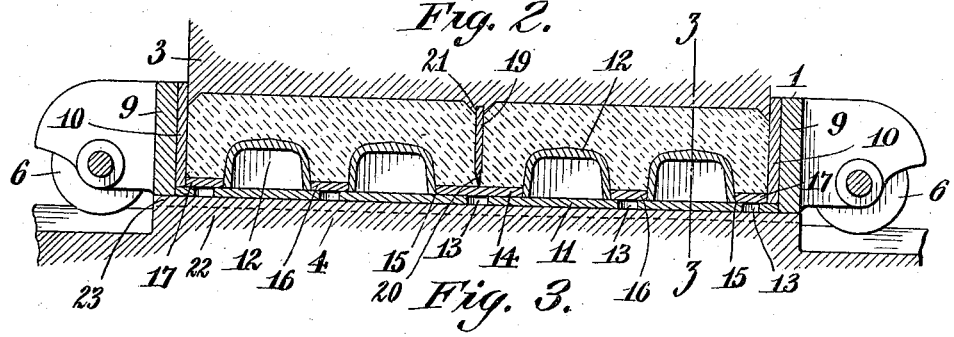
Figure 3:
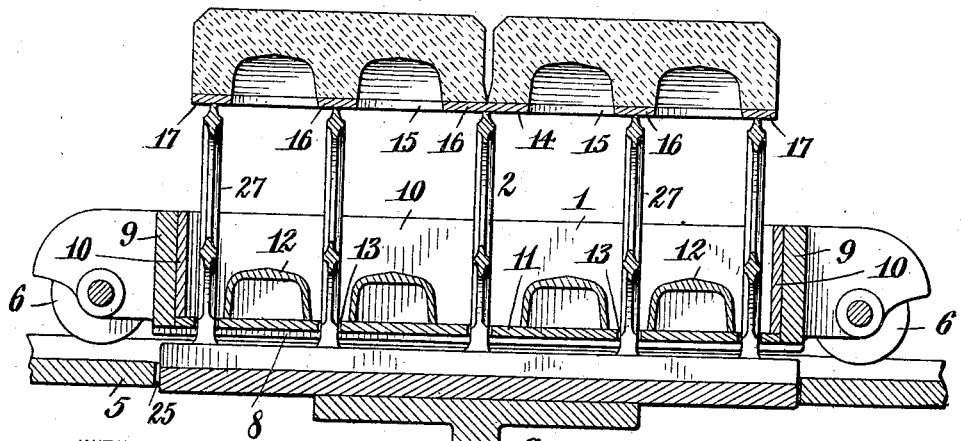

Figure 1 is a longitudinal section of a mold embodying my invention and the means provided for ejecting the molded blocks therefrom. Fig. 2 is a longitudinal section of the mold and a portion of the die, showing the manner of forming building-blocks, in this instance two blocks being molded at one operation. Fig. 3 is a view similar to Fig. 1, with the molded block ejected from the mold. Fig. 4 is a top plan view of my improved mold. Fig. 5 is a transverse section taken on line *z z*, Fig. 2. Fig. 6 is a detached perspective view of the removable block support or pallet. Fig. 7 is a detached perspective view of the combined division-plate and cutter. Fig. 8 is a detached perspective view of one of the ejecting members of the block-ejecting mechanism. Fig. 9 is a central longitudinal section of a mold having only three caps or fillers and designed to mold a single block.

My invention consists in the means for molding hollow building-blocks and in the means for ejecting the blocks when formed without removing or displacing the mold-bottom and the caps or fillers thereon.

This invention further consists in the construction, arrangement, and combination of parts to be hereinafter described, and particularly pointed out in the appended claims.

Referring now to the drawings in detail, corresponding numerals of reference refer to corresponding parts in the several figures.

The reference-numeral 1 designates the mold, and 2 the block-ejecting mechanism, to be considered as forming a part of the mold.

3 designates the die, which may be of any desired design, depending, of course, on the design to be given the molded block.

This improved mold is designed for use on a molding-press having a pressure-platform 4 and a filling and block-ejecting platform 5, the mold being provided with wheels 6 to permit of conveniently shifting the mold from one platform to the other. The press with which my improved mold is particularly adapted for use is the subject of another patent and no detailed reference is required thereto, except to state that it is arranged for filling the mold on the platform 5, after which it is pushed onto the pressure-platform 4 for coaction with the impression-die 3, and when the material contained in the mold is compressed the mold is returned to the platform 5 and the molded block ejected therefrom to permit filling of the mold for a second operation.

The mold is preferably of rectangular formation and comprises side walls 7, having at their lower edges inwardly-directed flanges 8 and end walls 9, somewhat narrower than the side walls, the upper faces of the flanges 8 and the lower edges of the end walls being on the same horizontal plane. The purpose of this will be hereinafter disclosed.

The mold is provided with removable liners 10, which may be of any thickness, depending on the size of the block to be molded. The manner of securing these liners is immaterial, any practicable way being permissible.

11 designates a removable mold-bottom, which receives support from the flanges 8 and is of sufficient strength to support the material placed in the mold to be compressed. The liners 10 of the mold are supported on the marginal portions of the bottom, and the latter has one or more caps or fillers 12 formed or secured thereon, the number depending on the size of the mold or the sizes of the blocks to be molded when more than one block is to be molded at one operation. I have shown the mold-bottom provided with four caps or fillers in Figs. 1 to 4, while in Fig. 9 I have shown three caps; but it is obvious that any number of caps or fillers may be used, and their shape, size, or proportion may be varied to suit the desires of the manufacturer or user.

Arranged transversely in the mold-bottom between the several caps and between the end caps and the end walls are openings 13, preferably elongated, and placed in the mold to lie on said bottom is a block support or pallet 14, having openings 15, through which the caps or fillers of the bottom extend, the openings being separated by the intermediate cross-bars 16, that lie between the caps or fillers and close the openings 13, arranged in the bottom between the caps. The end cross-bars 17 close the openings 13, arranged in the mold-bottom between the end caps and the end walls. Irrespective of the number of caps employed the openings in the mold-bottom, whatever their disposition or location, are closed by the block support or pallet.

In Figs. 1 to 4 I have shown each of the side liners provided mid-length with a vertical groove 18, into which a combined division-plate and cutter 19 is to be inserted, said cutter being provided with a beveled or sharped lower edge 20 for a purpose to be presently disclosed. When the mold is thus arranged, provision is made for molding two blocks at one operation, and the manner of accomplishnig this is as follows: The mold is partly filled with the material to be compressed, the division-plate or cutter is then placed into the alined grooves 18, after which the mold is entirely filled with material. When the mold is thus prepared, the division-plate extends above the top of the mold, which latter is now moved underneath the impression-die to cause compression of the material in the mold. The die has its impression-face designed to form two distinct blocks, and mid-length it is provided with a transverse groove 21, coincident with the division-plate. As the mold is elevated or the die lowered, as the case may be, the upper edge of the division-plate enters the groove in the die and is forced through the material being compressed to cut the same into two distinct blocks. When provision is made to form two blocks at a single operation, the space between the caps or fillers at the point of separating the material is enlarged, so that the openings formed in the blocks are evenly spaced with reference to the length of the blocks.

Manifestly the point of separation of the material may be nearer one end of the mold than the other when a long and a short block would be produced, or, if desired, division of the materal may be made a number of times by the insertion of the proper side liners and division-plates.

In connection with the mold the pressure-platform is provided with a pressure-block 22, having a central elevated portion 23, which extends up between the flanges 8 of the side walls of the mold, the reduced width of the end walls permitting the mold to ride onto the pressure-platform, so that the mold-bottom is given a solid bearing during the act of compressing the material contained in the mold, as shown in Figs. 2 and 5. The sides of the mold are also supported by the pressure-platform by reason of the flanges 8 thereof bearing on the ledges 24, formed on the longitudinal ledges of the pressure-block.

The platform 5 is provided with an opening 25, through which the ejecting mechanism 2 operates. This mechanism may comprise a support 26, to which suitable ejectors 27 are adjustably secured, said ejectors being disposed transversely and adapted to pass upward through the openings 13 in the mold-bottom and support and elevate the platen in the mold and the molded block thereon. Any suitable means may be provided to elevate the ejecting mechanism, the extent of elevation to be sufficient to eject the block and its support or platen from the mold, so as to permit its being removed and delivered to racks for setting and drying. By providing an ejector for each opening in the mold-bottom the block is given support at different points throughout its length, and the possibility of the block support or platen being bent or flexed is reduced to a minimum, thereby avoiding cracking of the block.

My invention is susceptible to many changes in form, construction, and disposition of parts, and I do not wish to limit myself to the exact arrangement herein shown, particularly since the illustrations disclose merely a representative way of using my invention. Therefore I hold myself at liberty to make such changes and modifications as fairly fall within the scope of the following claims, which are to be given the broadest construction permissible by the prior art.

Having thus described my invention, what I claim is—

1. In a device for molding blocks for building or like purposes, the combination with a pressure-platform having an elevated portion, and a block-ejecting platform, of a mold having wheels and adapted to be moved from one of said platforms to the other and having its end walls narrower than its side walls to permit of moving it over the elevated portion of the pressure-platform, a removable bottom for said mold receiving support from said pressure-platform and having openings therein, a pallet on said bottom, and mechanism adapted to pass through the opening in said bottom to eject the molded block from the mold when the latter is moved onto the block-ejecting platform.

2. A device for molding building-blocks or the like, consisting of a mold having its end walls narrower than its side walls and inwardly-directed flanges at the lower edges of its side walls whose upper sides are alined with the lower edges of the end walls, and a removable bottom supported on said flanges.

3. A device for molding building-blocks or the like, consisting of a mold having its end walls narrower than its side walls and inwardly-directed flanges at the lower edges of its side walls, removable liners applied to the inner sides of said walls, and a removable bottom held between the lower edges of said liners and the flanges on said side walls.

4. In a device for molding blocks for buildings and like purposes, the combination of a mold having a removable bottom provided with openings and with fillers or caps on its upper surface, a pallet lying on said bottom and having openings through which said fillers or caps extend and being adapted to close the openings in said bottom, and means adapted to pass through the openings in said bottom and engage the pallet to elevate the same.

5. In a device for molding blocks for buildings and like purposes, the combination of a rectangular mold having its end walls narrower than its side walls and its side walls provided with inwardly-extending flanges at their lower edges, and a removable bottom receiving support from said flanges and provided with openings, a pallet lying on said bottom, and means passing through said openings in the bottom for elevating the pallet after a block is formed thereon.

6. In a device for molding building-blocks for buildings and like purposes, the combination of a mold having its end walls narrower than its side walls and the lower edges of the end walls in a plane above the lower edges of the side walls, and having also a removable bottom provided with fillers or caps on its upper surface, a pallet having openings through which said fillers or caps extend, and means for elevating the pallet after a block is formed thereon.

7. A mold having its end walls narrower than its side walls and the lower edges of the end walls in a plane above the lower edges of the side walls.

8. A mold having the lower edges of its end walls in a plane above the lower edges of the side walls.

In testimony whereof I have affixed my signature in the presence of two subscribing witnesses.

GEORGE F. FISHER.

Witnesses:
 EMIL NEUHART,
 MAY F. SEWERT.